United States Patent [19]

Wittman

[11] Patent Number: 5,426,885
[45] Date of Patent: Jun. 27, 1995

[54] TACKLE TOTE

[75] Inventor: Boyd C. Wittman, Shorewood, Minn.

[73] Assignee: Empak, Inc., Chanhanssen, Minn.

[21] Appl. No.: 64,931

[22] Filed: May 20, 1993

[51] Int. Cl.⁶ ............................................. A01K 97/04
[52] U.S. Cl. ..................... 43/54.1; 43/57.1; 206/315.11; 312/902; 312/319.1; 312/244
[58] Field of Search ................. 312/902, 9.63, 9.57, 312/319.1, 244; 206/315.11; 43/57.1, 54.1

[56] References Cited

U.S. PATENT DOCUMENTS

| | | |
|---|---|---|
| 655,020 | 7/1900 | Schroeder . |
| 666,359 | 1/1901 | Schroeder . |
| 1,450,974 | 4/1923 | Heotes . |
| 3,330,608 | 7/1967 | Druger, Jr. . |
| 3,399,939 | 9/1968 | Anderson . |
| 3,481,066 | 12/1969 | Woolworth ......................... 312/244 |
| 3,592,521 | 7/1971 | Cox ................... 312/319.1 |
| 3,606,511 | 9/1971 | Henning et al. . |
| 3,658,398 | 4/1972 | Abbate, Jr. et al. . |
| 4,023,875 | 5/1977 | Difley ............................. 312/319.1 |
| 4,157,763 | 6/1979 | Betlejewski ..................... 312/244 |
| 4,634,193 | 1/1987 | Liu . |
| 4,729,474 | 3/1988 | Lanius et al. . |
| 4,841,661 | 6/1989 | Moore ................................ 43/54.1 |
| 4,929,861 | 5/1990 | Metcalf ............... 312/9.63 |
| 5,069,342 | 12/1991 | Dickinson . |
| 5,094,516 | 3/1992 | Hunter ............................. 312/319.1 |
| 5,334,904 | 8/1994 | Kramer . |
| 5,363,961 | 11/1994 | Bieck ................... 206/387 |

FOREIGN PATENT DOCUMENTS

| | | | |
|---|---|---|---|
| 0009754 | of 1916 | United Kingdom ............... | 312/9.57 |
| 0499439 | 1/1939 | United Kingdom ............. | 312/319.1 |

*Primary Examiner*—Mark Rosenbaum
*Assistant Examiner*—James Miner
*Attorney, Agent, or Firm*—Haugen and Nikolai

[57] ABSTRACT

This is an improved container having slidable storage cases propelled by a leaf spring into an open position after pushing down on a front catch. The container comprises a front half, a rear half and a handle, each molded from plastic. The front half and the rear half of the container are ultrasonically bonded together rotatably securing the handle between them. The front and the rear half have six case slots. The front half case slots are defined by a central vertical divider extending from the top to the bottom of the front half and three rows of horizontal M-shaped plastic dividers. Each M-shaped divider is essentially a spring with a lip on it at the central point of the M-shaped divider. The lip can be pushed down and snaps back into place. The rear half is divided into six case slots by a central vertical divider extending from the top to the bottom of the rear half and six sets of guide rails. Extending into the rear half from the back of the container are six leaf springs, one for each case slot. A case is inserted into a case slot over the lip of the M-shaped divider and between the guide rails in the rear half. The rear end of the case pushes against the leaf spring causing the leaf spring to coil or become tense and push against the rear of the case. The front lip catches the front end of the case and holds the case in a closed position. To pop the case out of the container, the front lip is pushed down, the leaf spring releases pent-up tension and the case is propelled out of the container into an open position.

10 Claims, 4 Drawing Sheets

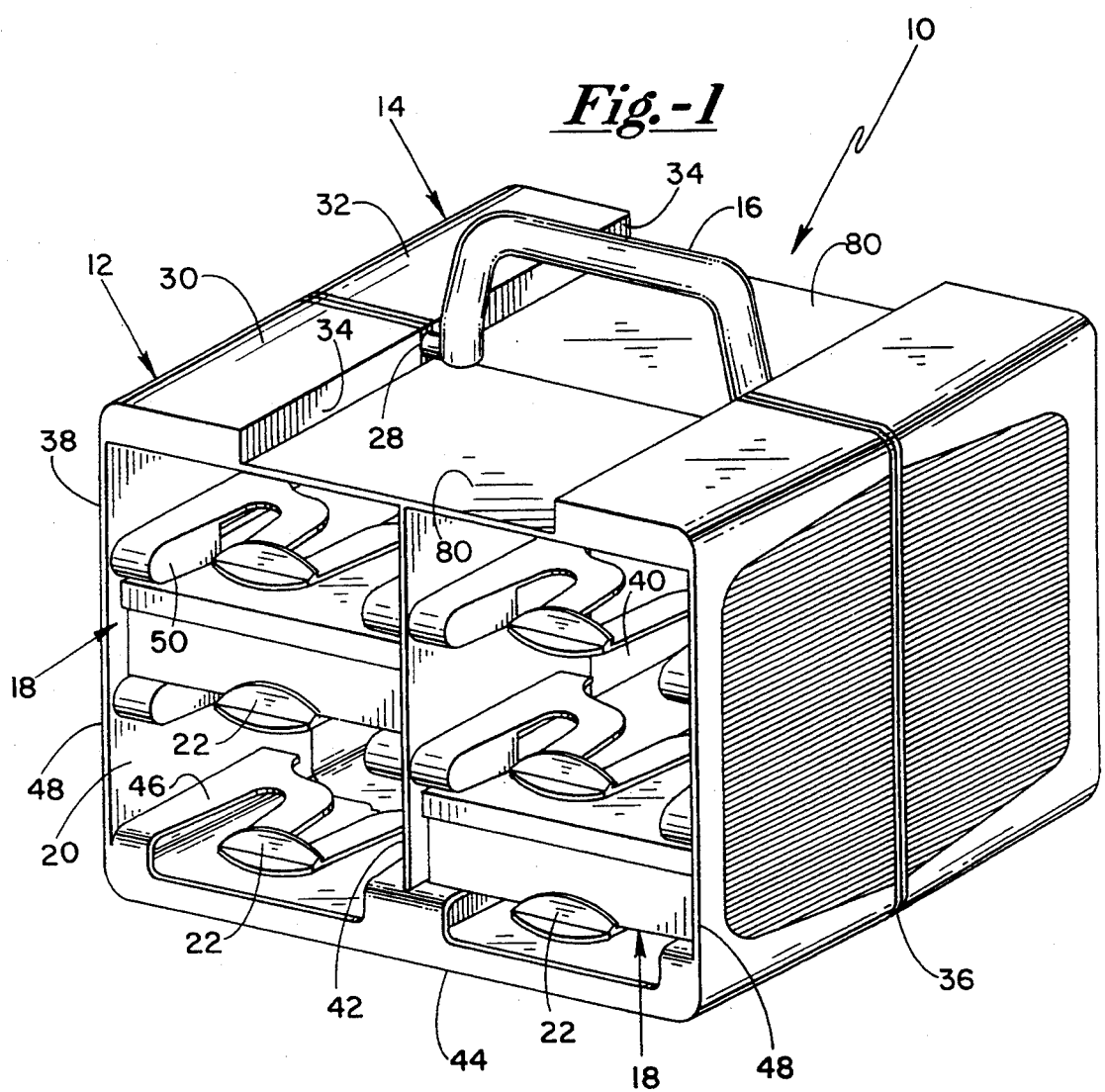

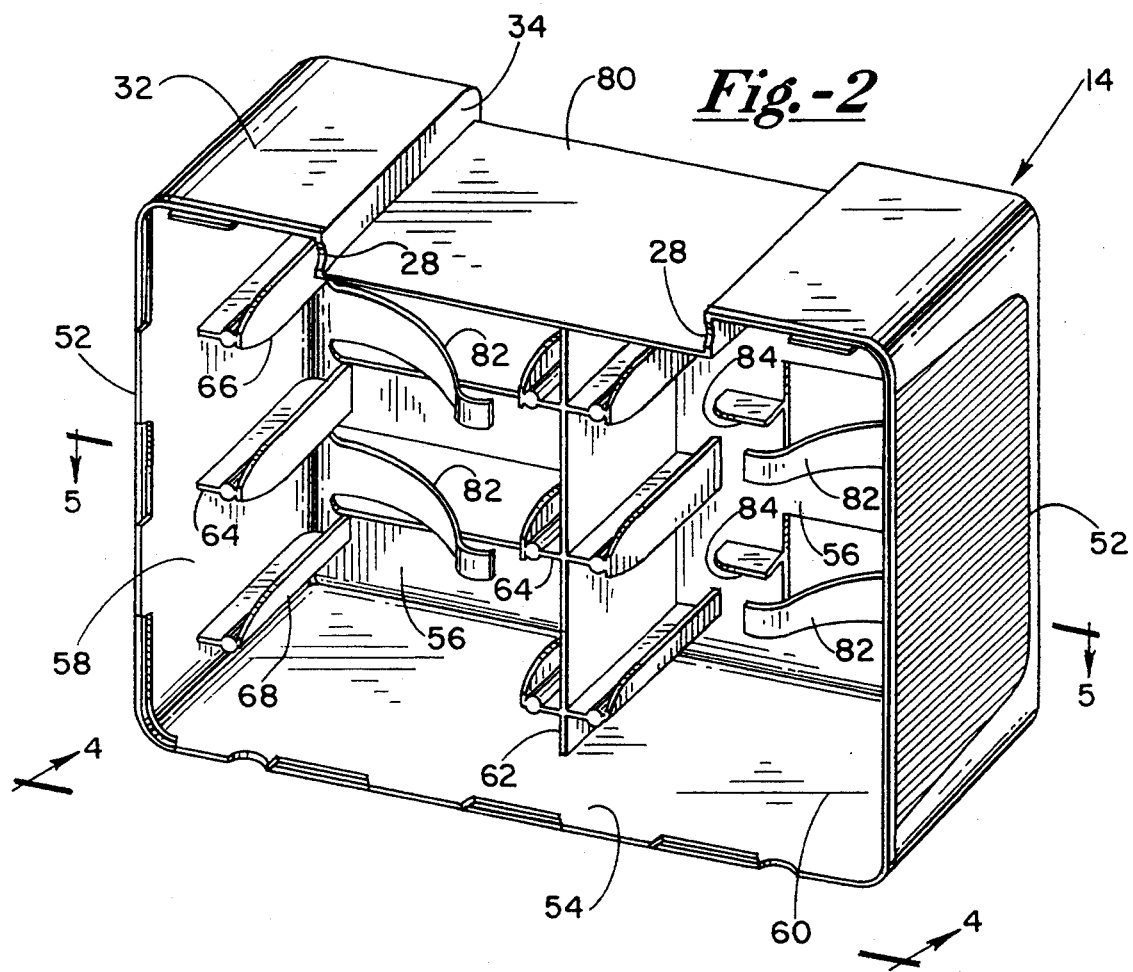
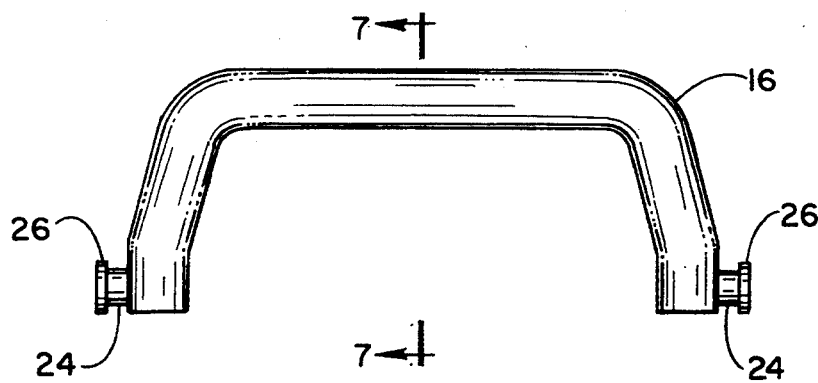 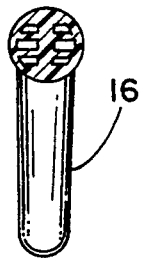

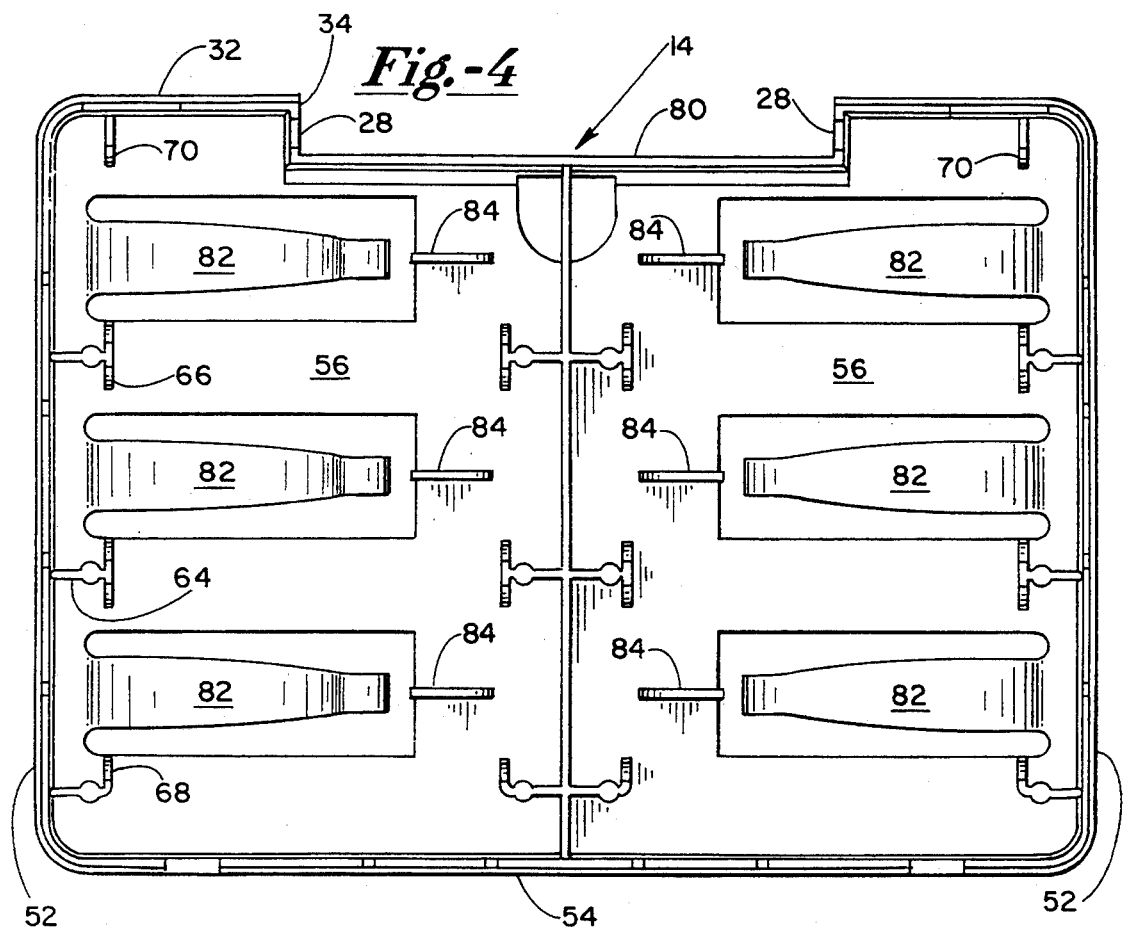
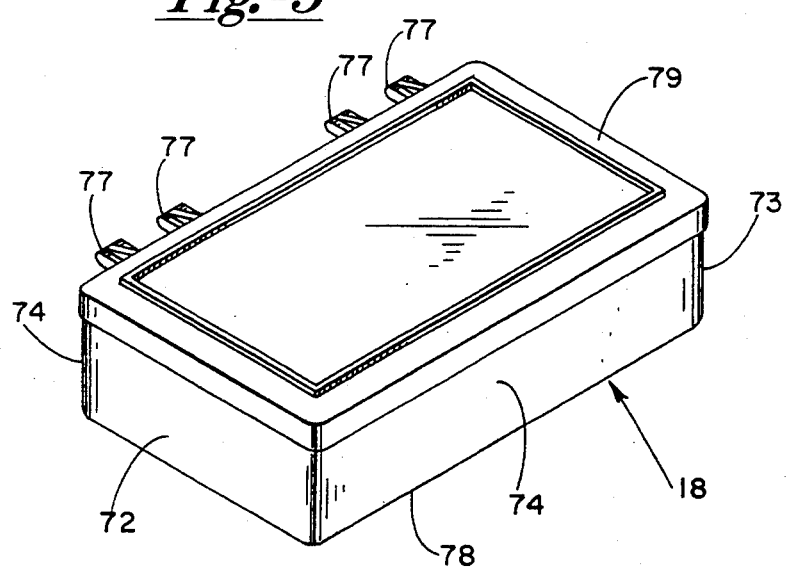

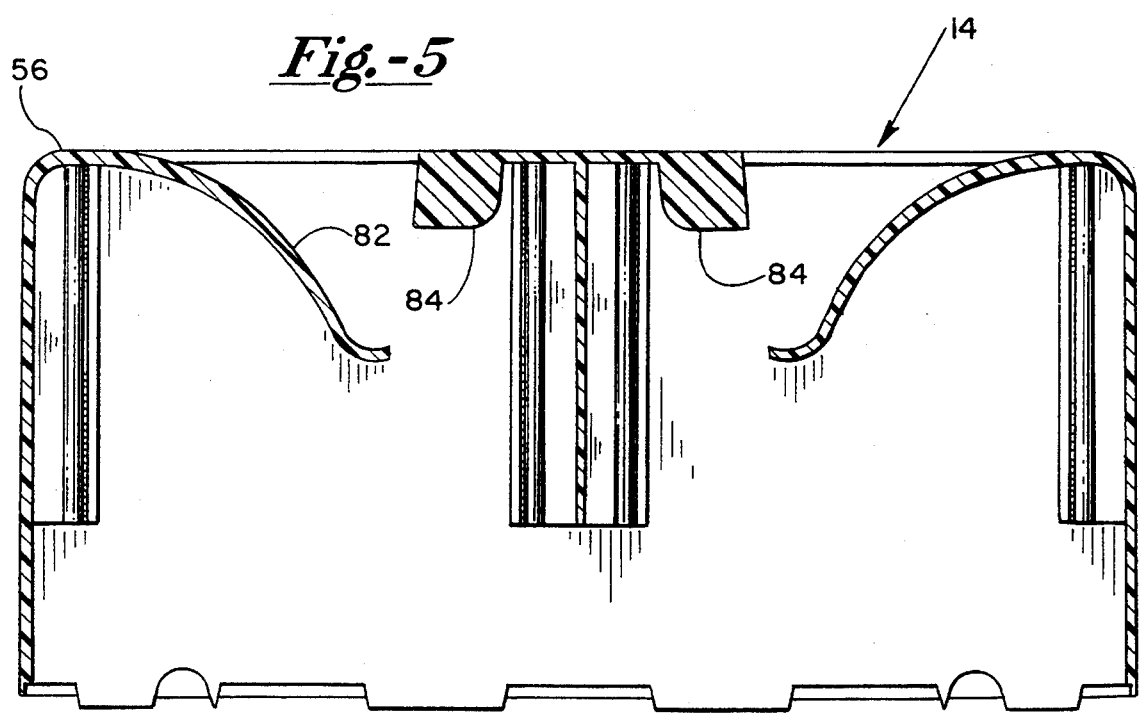

TACKLE TOTE

BACKGROUND OF THE INVENTION

I. Field of the Invention

This invention relates generally to containers and more particularly, to an improvement in boxes used for storing and transporting tools, fishing tackle and other small items.

II. Discussion of the Prior Art

The use of containers or cabinets for storing and transporting objects of various sizes is old and well known in the art. Fishing tackle boxes, for example, come in a variety of different constructions to accommodate different fishing lures and other articles used while fishing. In general, the tackle boxes have either cantilevered storage compartments or slidable storage drawers. A tackle box having cantilevered storage compartments allows simultaneous accessibility to all of the contents of the box. However, such boxes are often difficult to use in cramped quarters such as small fishing boats. Slidable storage drawers overcome this problem by requiring less free space to access the contents of the drawers. The prior art tool boxes have similar designs.

In the past, hinged tops and cover plates having latches for closing a box were used to hold the cantilevered storage compartments and slidable storage drawers in place. To open the boxes, the latches are undone, the top or cover plate is moved into the open position and the desired slidable drawer or cantilevered storage compartment is opened. This is a cumbersome, tedious process for a person who is holding a fishing pole or car part in one hand and trying to grab a lure or tool with the other. To make it easy to retrieve a desired lure or tool in cramped quarters, such as in a fishing boat, the present invention incorporates slidable storage cases that automatically eject at the push of a button or lip. The cases are spring activated and eject independently of other cases in the box, without opening a plurality of latches.

Cabinets having drawers and springs that assist in ejecting the drawers have been described in prior patents. Such patents include U.S. Pat. Nos. 1,450,974, 655,020 and 666,359. Each of these patents show a separate coil spring used for propelling the drawer into the open position. In the '359 and '020 patents, a lip fixed to the frame of the cabinet is used to hold the drawer in place. To open the drawer, the drawer is lifted so the base of the drawer clears the top of the lip. A different arrangement is used in the '974 patent for releasing the drawer from the closed position. The '974 patent requires insertion of a special tool into a hidden slot underneath the drawer. The tool pushes up on a leaf spring attached to the bottom of the drawer, releasing it from behind a front panel and subsequently the drawer from the frame of the cabinet. The drawer springs open due to the recoil of the spring behind the drawer. From a practical standpoint, it must be recognized that tools of this type are easily misplaced and cumbersome to use. Therefore, the design shown in the '974 patent is not suitable for an easily accessible container.

From the above discussion, it can be seen that the prior art does not disclose a container having a spring for propelling the drawers open at the push of a readily accessible lip or button.

The present invention overcomes the problems of easy access in a confined area by providing a container, such as a tool box or fishing tackle box, incorporating slidable storage cases that are locked into a closed position by a readily releasable catch. Leaf springs behind the cases propel the cases out of their closed position after the releasable plastic lip or catch has been pushed.

SUMMARY OF THE INVENTION

It is accordingly a principal object of the invention to provide an improved container.

Another object of the invention is to provide an improved container that is easily accessible in a confined area.

Yet another object of the invention is to provide an improved container having readily accessible catches for holding cases of the container in a closed position, and leaf springs for propelling the cases out of the closed position when the catches are released.

Still another object is to provide such a container made of plastic and wherein such leaf springs are integrally molded with a wall of the container and engage the rear of the sliding cases.

Still another object is to provide such a box, made of plastic, wherein such catches are integrally molded with walls of the box and engage the front of the slidable cases to counteract the force of the leaf springs when the cases are in the closed position.

The foregoing objects of the present invention are attained by providing a container generally rectangular in shape having six case slots in the front and a handle rotatably connected to the top. The container body has a front half and a rear half made out of plastic. The two halves are ultrasonically bonded together. At the back of each case slot is an integrally molded leaf spring. The leaf springs are designed to force the associated case out of its closed position when the catch at the front of the case is moved out of engagement with the case front. The catches are integrally molded and designed to provide a spring action so cases will not pop out unless the required force is applied to the catch to overcome the spring force on the catch and move the catch out of engagement with the case front.

Other objects, features and advantages of the present invention will become apparent to those skilled in the art through the description of the preferred embodiment, claims and drawings herein.

BRIEF DESCRIPTION OF THE DRAWINGS

FIG. 1 is a perspective view of the container in accordance with the present invention showing the handle in an upright position and case slots with and without cases;

FIG. 2 is a perspective view of the rear half of the container showing guide rails, leaf springs and rear case stops;

FIG. 3 is a perspective view of a case;

FIG. 4 is a cross-sectional view of the rear half of the container taken along the line 4—4 in FIG. 2, showing the guide rails, leaf springs and rear case stops;

FIG. 5 is a cross-sectional view of the rear half of the container taken along the line 5—5 in FIG. 2 showing the leaf springs and rear case stops extending into the container;

FIG. 6 is a front view of the handle; and

FIG. 7 is a cross-sectional view of the handle taken along the line 7—7 in FIG. 6.

DESCRIPTION OF THE PREFERRED EMBODIMENT

Shown in FIG. 1 is a container 10 comprising a front half 12, a rear half 14, a handle 16 and cases 18. As shown, the container 10 has six case slots 20, three on each side of a central vertical divider 42. Each case slot 20 accommodates one case 18. Of course, either a fewer or greater number of case slots could be provided without deviating from the present invention. All of the pieces of the container 10 are made out of plastic. The front half 12 and the rear half 14 are ultrasonically bonded together to form the container 10.

As shown in FIG. 3, each case 18 comprises a rectangular box having a front end 72, a rear end 73, two sides 74, a bottom 78 and a hinged top 79. On one side 74 of the case 18 are plastic hinges 77 of the ball and socket variety for connecting the top 79 to the one side 74.

As indicated above, the container 10 has a front half 12 and a rear half 14. The interior construction of the rear half 14 of the plastic container 10 is best shown in FIG. 2. It includes a top 32, two sides 52, a bottom 54, and a back 56. The rear half 14 is divided into a left half 58 and a right half 60 by a central rear partition 62 extending from the top 32 to the bottom 54. The rear partition 62 is connected to the top 32, the bottom 54 and the back 56. The rear half 14 also includes 6 pairs of guide rails 64. Each pair of guide rails 64 assists in forming a case slot. One guide rail of each pair is molded to the side of the central rear partition 62. The other of each pair is integrally molded to one of the sides 52. Each guide rail 64 has a vertical flange 66 or 68 connected to the innermost horizontal edge in each of the halves 58 and 60. The top two rows of guide rails 64 have a vertical flange 66 extending above and below the horizontal portion of the guide rail 64. The bottom row of guide rails 64 have vertical flanges 68 extending only upward toward the top 32 of the rear half 14. Molded to the top 32 of the rear half 14 are two vertical guides 70, FIG. 4, extending down from the top 32 and vertically in line with the vertical flanges 66 and 68 of the guide rails 64.

As shown in FIGS. 2, 4 and 5, extending from the back 56 of the rear half 14 are six leaf springs 82. The leaf springs 82 extend from the back corners of the rear half 14 into the inner portion of the rear half 14. A separate leaf spring 82 is provided for each case slot 20.

The front half 12 of the container 10 is best shown in FIG. 1. The front half 12 is also divided into a left half 38 and a right half 40 by an integrally molded central front partition 42. The front partition 42 extends from the top 30 to the bottom 44 of the front half 12. The left half 38 and the right half 40 of the front half 12 are each divided into three case slots 20 by three plastic M-shaped dividers 46. The M-shaped dividers 46 are stacked horizontally in face-to-face spaced apart relation and, along with the guide rails 64 of the rear half 14, help define the case slots 20. The M-shaped dividers 46 are integrally molded with the front half 12 and each is connected to one side 48 of the front half 12 and the central front partition 42. Each M-shaped divider 46 has a vertical lip 22 in the middle of the M-shaped divider at the central point, near the base of the M-shape. Each M-shaped divider 46 is essentially a spring which permits the lip 22 to be pushed down manually. When the lip 22 is released, it will spring or snap back into place. Case guides 50 are molded just below the top two rows of M-shaped dividers 46 and below the top 30 of the front half 12 (not shown). The case guides 50, as explained below, guide the cases 18 into and out of the container 10.

When assembled, a case 18 is inserted into the container 10 by sliding the bottom 78 of the case 18 over the lip 22 of the M-shaped divider 46. The bottom 78 of the case 18 rides on top of the M-shaped divider 46 and the vertical flanges 66 or 68 of the guide rails 64. The guides 64 and 70 assist in guiding the drawer 18 into the container 10. The top 79 edge of the case 18 rides just underneath the case guides 50 and also the lower portion of the vertical flanges 66. The top 79 of the cases 18 slide into the two top drawer slots 20 just below the vertical guides 70 and indented portions 80 of the front and rear tops 30 and 32.

When inserted into the case slot 20, the rear end 73 of the case 18 engages the leaf spring 82. As the case 18 is slid into the case slot 20, the leaf spring 82 applies an outward force on the case 18. By pushing the case 18 far enough into the container 10, the front end 72 of the case 18 slides in back of the lip 22 of the M-shaped divider 46. The lip 22 catches the front end 72 of the case 18 and holds the case 18 in the closed position. To prevent the case 18 from being pushed in too far and damaging the leaf spring 82, a rear case stop 84 is connected to the back 56 of the rear half 14. The rear case stop 84 extends horizontally into the rear half 14 of each case slot 20.

In operation, a case 18 is slid into each of the six case slots 20 through the front half 12 and into the rear half 14 of the container 10. The cases 18 ride on top of the M-shaped dividers 46 in the front half 12, and between the guide rails 64 in the rear half 14. As the cases 18 are advanced further into the case slots 20, the back of each case 18 engages the leaf spring and pushes it into a tensed position. When the case 18 is all the way in the closed position, the lip 22 of the M-shaped divider 46 catches the front end 72 of the case 18 to hold the case 18 in place. To pop a case 18 out of the container 10, the lip 22 of the M-shaped divider 46 is manually pushed down and the leaf spring 82 releases its tension, propelling the case 18 from the closed position. As such, the user can attain access to any case 18 of the container 10 by the touch of a button (i.e., the lip).

As shown in FIG. 6, a handle 16 made out of rigid plastic may be provided. A cross-section of the handle 16, FIG. 7, shows the handle to be essentially round, however, it is to be understood that the handle may be any convenient shape or size and may be made out of a material other than rigid plastic. At each end of the arch of the handle 16 is a horizontal extension 24 having an outer rim 26 with a larger diameter than the inner body of the extension 24. As shown in FIGS. 1 and 2, the front half 12 and the rear half 14 of the container 10 have semicircular grooves 28 in the middle at the top. When the container 10 is assembled, the semicircular grooves 28 are aligned with one another to form a circular bearing for rotatably securing the handle 16 to the container 10. To achieve this, those skilled in the art will recognize that the circle or hole formed by the semicircular grooves 28 must be larger in diameter than the main body of the horizontal extension 24 but smaller in diameter than the outer rims 26 of the handle 16. When assembled, the outer rims 26 of the horizontal extensions 24 are positioned inside the front half 12 and the rear half 14 of the container 10. Thus, when the front half 12 and the rear half 14 are ultrasonically bonded together the handle 16 is rotatably secured between the two halves.

As shown in FIG. 1, the front top 30 of the front half 12 and the rear top 32 of the rear half 14 each have an indented rectangular slot 80 into which the handle 16 may be rotated for compact storage and stackability. The semicircular grooves 28 are formed into the side walls 34 of the indented rectangular slots 80 of the front and rear tops 30 and 32. To carry the container 10, the handle 16 is simply rotated into its upright position.

This invention has been described herein in considerable detail in order to comply with the Patent Statutes and to provide those skilled in the art with the information needed to apply the novel principles and to construct and use such specialized components as are required. It is to be understood that the invention can be carried out by specifically different means and that various modifications can be accomplished without departing from the scope of the invention itself.

What is claimed is:

1. A container comprising:
    (a) wall means forming a plurality of case slots, said wall means comprising a top, a bottom and two sides;
    (b) vertical partition means attached to said top and said bottom for dividing the container into side portions and separating adjacent case slots of said plurality of case slots, said vertical partition means connecting said top and said bottom;
    (c) horizontal spring dividers in each side portion attached to said wall means and said vertical partition means in spaced stacked relation, each of said horizontal spring dividers being one half of a bottom of one case slot of said plurality of case slots;
    (d) a vertical lip carried by each horizontal spring divider and disposed in the one case slot of said plurality of case slots; and
    (e) spring means attached to said wall means for engaging and moving a case out of each case slot of said plurality of case slots.

2. The container of claim 1 wherein all elements are integrally molded.

3. The container as in claim 1 wherein said wall means comprises a front half and a rear half, wherein said front half carries said horizontal spring dividers and said rear half carries guide rails means aligned with said horizontal spring dividers for guiding and supporting the case in each case slot of said plurality of case slots.

4. The container as in claim 1 wherein said spring means comprises a plurality of springs attached to said wall means wherein each spring of said plurality of springs engages the case from behind.

5. A container comprising:
    (a) wall means forming a plurality of identically sized case slots, said wall means comprising a top, a bottom and two sides;
    (b) central vertical partition means integrally formed with said wall means and connecting said top and said bottom, said central vertical partition means for dividing the container into identical side portions and for acting as a common side wall between adjacent case slots of said plurality of identically sized case slots;
    (c) M-shaped horizontal spring dividers integrally formed with said wall means and said central vertical partition means, said M-shaped horizontal spring dividers being evenly spaced and stacked in each side portion to form said plurality of identically sized case slots, each of said M-shaped horizontal spring dividers being one half of a bottom for one case slot of said plurality of identically sized case slots;
    (d) vertical lip means integrally formed with each M-shaped horizontal spring divider and disposed in the one case slot of said plurality of identically sized case slots for releasably holding a case in the one slot; and
    (e) spring means integrally formed with said wall means for engaging and moving the case out of each case slot of said plurality of identically sized case slots.

6. The container as in claim 5 wherein said wall means comprises a front half and a rear half, wherein said front half carries said M-shaped horizontal spring dividers and said rear half carries guide rail means aligned with said M-shaped horizontal spring dividers for acting as part of a bottom of each case slot of said plurality of identically sized case slots.

7. The container as in claim 5 wherein said spring means comprises leaf springs integrally formed with said rear half of said wall means and disposed in the rear of each case slot of said plurality of identically sized case slots.

8. A container comprising wall means having a top and a bottom forming a plurality of case slots and also having an integrally molded central vertical partition dividing the container into identical side halves wherein the central vertical partition is continuous between the top and the bottom to act as a common side wall between adjacent case slots of said plurality of case slots, said wall means also having evenly spaced integrally molded horizontal spring dividers between said wall means and said central vertical partition in each side half wherein each spring divider is one half of a bottom of one case slot of said plurality of case slots and carries vertical lip disposed in said one case slot of said plurality of case slots for releasably holding a case in said slot against spring means integrally formed with said wall means for engaging and moving the case out of each case slot of said plurality of case slots.

9. The container as in claim 8 wherein said wall means comprises a front half carrying said horizontal spring dividers and a rear half carrying guide rail means aligned with said horizontal spring dividers for acting as another part of the bottom of each case slot of said plurality of case slots.

10. The container as in claim 8 wherein said spring means comprises leaf springs integrally molded with said rear half of said wall means and disposed behind the case in each case slot of said plurality of case slots.

* * * * *